Figure 1:
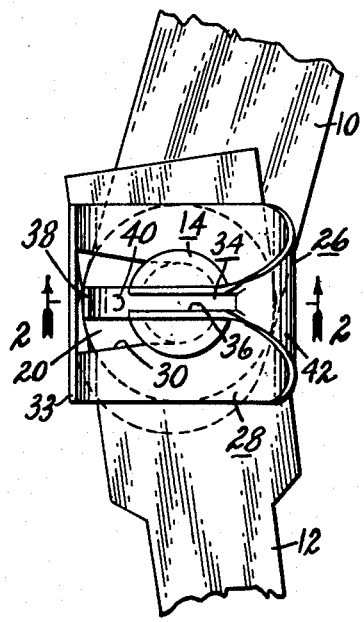

April 20, 1965   E. E. REESE ETAL   3,178,987
RETAINER CLIP
Filed Oct. 16, 1962

INVENTORS
ELMER E. REESE
THOMAS E. STARK
BY
W. E. Finken
THEIR ATTORNEY

United States Patent Office 3,178,987
Patented Apr. 20, 1965

3,178,987
RETAINER CLIP
Elmer E. Reese and Thomas E. Stark, Rochester, N.Y.,
assignors to General Motors Corporation, Detroit,
Mich., a corporation of Delaware
Filed Oct. 16, 1962, Ser. No. 230,859
6 Claims. (Cl. 85—8.8)

This invention pertains to fasteners, and particularly to an improved spring clip for retaining pivotally interconnected parts in assembled relation.

In linkage drive mechanisms for vehicle windshield wipers of the type shown in Contant Patent 3,025,552, the inner ends of drive links are pivotally connected to a rotary crank assembly so as to have imparted thereto reciprocating motion during rotation of the crank assembly. Heretofore, it has been the practice to retain the drive links in assembled relation with the upstanding crank pins of the crank assembly by means of generally C-shaped washers which are interlocked with annular grooves in the crank pins. Since there is always a likelihood of misalignment of component parts in a vehicle windshield wiper drive mechanism due to manufacturing tolerances, it is necessary to permit slight end play in an aixal direction between the crank pin and the drive link. This can be accomplished with a C-shaped washer only if the parts are loosely assembled.

According to the present invention, the pivotally interconnected parts are held in assembled relation by a retainer clip having a bowed leg structure which automatically takes up the end play where no misalignment is present, and yet permits the necessary end play in instances where misalignment occurs. Therefore, among our objects are the provision of a clip for retaining pivotally interconnected parts in assembled relation including bowed spring means for taking up end play; the further provision of a U-shaped spring clip having a first arched leg and a second leg adapted to be interlocked with one of the parts so as to preclude rotation of the clip relative to said part; and the still further provision of a clip of the aforesaid type including abutment means for precluding inadvertent withdrawal of the clip.

The aforementioned and other objects are accomplished in the present invention by utilizing a U-shaped clip, or fastener, having a lower spring leg which is bowed longitudinally and an upper reinforced spring leg adapted to interlock with a component part. Specifically, the clip is designed for attachment to an upstanding crank pin having an annular groove adjacent its end and a diametrical groove in its end surface. The apertured end of a link is journalled on the pin, after which the clip is attached to the end of the pin to retain the component parts in assembled relation.

Further objects and advantages of the present invention will be apparent from the following description, reference being had to the accompanying drawing, wherein a preferred embodiment of the present invention is clearly shown.

Figure 2:
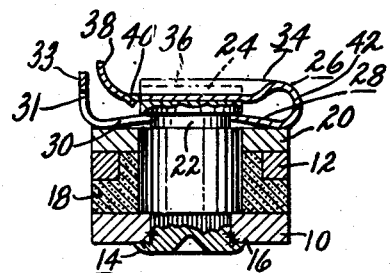
Figure 3:
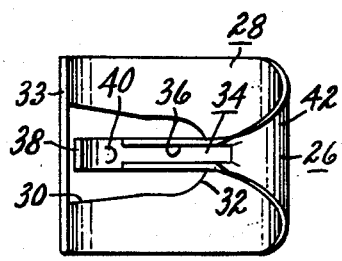
Figure 5:
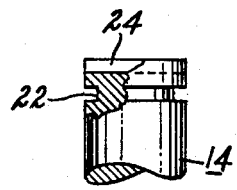
Figure 4:
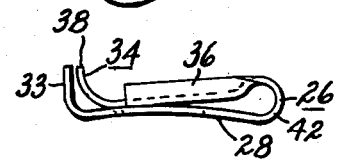

In the drawing:
FIGURE 1 is a fragmentary plan view, in elevation, of the component parts and the retainer clip.
FIGURE 2 is a sectional view taken along line 2—2 of FIGURE 1.
FIGURE 3 is a plan view of the retainer clip.
FIGURE 4 is a side view of the retainer clip.
FIGURE 5 is a fragmentary view, partly in section and partly in elevation, of the pin for receiving the clip.

With particular reference to the drawing, the improved retainer clip is adapted to maintain a pair of pivotally interconnected parts, such as a rotatable crank arm 10 and a reciprocable drive link 12 in assembled relation. To this end, the crank arm 10 has an upstanding crank pin 14 rigidly connected thereto by a press fit and weld at 16 in accordance with the teachings of the Carlson et al. Patent 3,039,798. A bushing 18 of sintered bronze is assembled over the crank pin 14 and the apertured end of the drive link 12 is journalled on the bushing 18. A flat washer 20 is placed over the apertured end of the drive link 12 and the crank pin 14.

As seen particularly in FIGURE 5, the crank pin 14 is formed with an annular groove 22 located axially inward of its outer end, and a diametrical groove 24 in its end surface. The drive link 12 is held in assembled relation with the crank pin 14 by a retainer clip, or fastener, 26.

As seen more clearly in FIGURES 3 and 4, the retainer clip 26, which is preferably made from spring metal such as stainless steel, is generally U-shaped, and comprises a first leg 28 which is bowed longitudinally, the leg 28 having a closed slot 30 with marginal edges that converge from an entrance opening 31 to a semicircular inner end 32. The entrance opening 31 of the slot 30 is located in an upturned end web 33 which closes the outer end of the slot. The clip includes a second leg 34 which overhangs and is located substantially midway between the marginal edges of the slot 30 in the leg 28, the leg 34 having a channel-shaped reinforced portion 36, an upturned end 38, and a downwardly projecting tang, or abutment, 40. The spring legs 28 and 34 are interconnected by a tapered bight portion 42 as shown in FIGURE 3.

In attaching the clip 26 to the crank pin 14, the entrance opening 31 of the slot 30 in the upturned end web 33 of the leg 28 is passed over the end of the crank pin 14 with the marginal edges defining the slot 30 in engagement with the annular groove 22, and the leg 34 aligned with the diametrical groove 24. Upon transverse movement of the clip 26, the leg 34 will snap into the diametrical groove 24 as soon as the abutment, or tang, 40 is disengaged from the crank pin. Thereafter, transverse movement of the clip relative to the pin in one direction is limited by engagement of the semicircular end wall 32 of the slot 30 with the crank pin and movement in the opposite direction is limited by the abutment 40 which is designed to engage the periphery of the crank pin. When the clip 26 is attached to the crank pin, the legs 28 and 34 are spread apart since the leg 28 is confined by the groove 22 and the leg 34 is situated in the transverse groove 24 of the crank pin. Engagement of the leg 34 with the transverse groove 24 in the crank pin precludes rotation of the clip 26 relative to the crank pin 14 and the crank arm 10.

The bowed, or arched, leg 28 engages the washer 20 and automatically takes up the axial end play between the drive link 12 and the crank arm 10, as shown in FIGURE 2. If there is any misalignment in the component parts of the wiper drive linkage, the bowed leg 28 will be deflected upwardly towards the leg 34 during relative movement between the drive link 12 and the crank arm 10. The clip 26 will maintain the parts in assembled relation, and can be readily removed if necessary. This can be accomplished by lifting the end 38 of the leg 34 so that the abutment 40 will clear the crank pin 14, after which the clip 26 can be slid transversely and removed from the crank pin 14.

While the embodiment of the invention as herein disclosed constitutes a preferred form, it is to be understood that other forms might be adopted.

What is claimed is as follows:

1. A clip for retaining a pair of pivotally interconnected parts in assembled relation while permitting limited end play therebetween, one of said parts having an upstanding pin attached thereto with an annular groove located axially inward of its end and a diametrical groove extending completely across the end surface of said pin, and the other of said parts having an apertured end journalled on said pin, including, a U-shaped spring metal member having a first longitudinally arched leg with a closed slot therein having marginal edges adapted to be disposed in the annular groove of said pin, and a second leg having a width corresponding to the width of said diametrical groove and adapted to lie within said diametrical groove in interlocking engagement therewith for precluding rotation of the clip relative to the pin, said second leg having an upturned end and a depending abutment adjacent the free end thereof and engageable with the periphery of said pin at the bottom of said diametrical groove for preventing inadvertent withdrawal therefrom.

2. A U-shaped retaining clip designed for attachment to a cylindrical part having an annular groove located axially inward of its end and a diametrical groove extending completely across the end surface of said cylindrical part, comprising, a first leg having a closed slot therein with marginal edges adapted for reception in the annular groove of said part, said first leg being longitudinally bowed between its ends, and a second leg having a width corresponding to the width of said diametrical groove and overhanging said first leg and adapted to lie within the diametrical groove in interlocking engagement therewith, said second leg having an upturned end and integral abutment means adjacent the free end thereof and engageable with the periphery of said part at the bottom of said diametrical groove for preventing inadvertent withdrawal therefrom.

3. A U-shaped retaining clip designed for attachment to a cylindrical part having an annular groove located axially inward of its end and a diametrical groove extending completely across the end surface of said cylindrical part, comprising, a first longitudinally arched spring leg having a closed slot therein with marginal edges adapted for reception in the annular groove of said part, and a second spring leg having a width corresponding to the width of said diametrical groove overhanging said first leg and adapted to lie within said diametrical groove in interlocking engagement therewith, said second leg being channel-shaped throughout the major portion of its length and having integral abutment means adjacent the free end thereof and engageable with the periphery of said part at the bottom of said diametrical groove for preventing inadvertent withdrawal therefrom.

4. A U-shaped spring metal retaining clip designed for attachment to a cylindrical part having an annular groove located axially inward of its end and a diametrical groove extending completely across the end surface of said cylindrical part, comprising, a first leg having a closed slot therein with converging marginal edges extending from an entrance opening to a semi-circular inner end, the marginal edges being adapted for reception in the annular groove of said part, said first leg being longitudinally bowed between its ends, and a second leg having a width corresponding to the width of said diametrical groove and overhanging said first leg and adapted to lie within said diametrical groove in interlocking engagement therewith, said second leg being channel-shaped throughout the major portion of its length and having a depending tang adjacent the free end thereof and engageable with the periphery of said part at the bottom of said diametrical groove for preventing inadvertent withdrawal therefrom.

5. The clip set forth in claim 4 wherein said first leg has an upturned end web, wherein the entrance portion of said slot terminates in said upturned end web, and wherein the terminal end of said second leg is upturned and spaced from the upturned end web of said first leg.

6. The clip set forth in claim 4 wherein said first and second legs are interconnected by a tapered bight portion, and wherein said second leg is aligned with the slot in said first leg and disposed substantially equidistantly from the marginal edges thereof.

References Cited by the Examiner

UNITED STATES PATENTS

| 350,533 | 10/86 | Freeman et al. | 85—5.5 |
| 1,058,583 | 4/13 | Hart | 85—8.9 |
| 2,078,453 | 4/38 | Miller | 85—8.8 |
| 2,237,465 | 4/41 | Zimmermann | 85—8.8 |

FOREIGN PATENTS 662,879 12/51 Great Britain.

EDWARD C. ALLEN, *Primary Examiner.*